(12) United States Patent
Hendin et al.

(10) Patent No.: US 9,632,969 B2
(45) Date of Patent: Apr. 25, 2017

(54) SYSTEMS AND METHODS FOR MANAGING A WIRELESS CONNECTION BETWEEN A COMPUTING DEVICE AND A PERIPHERAL MODULE

(75) Inventors: Neil Hendin, Mountain View, CA (US); Ajay Chandra Venkata Gummalla, Sunnyvale, CA (US); Trond Thomas Wuellner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1169 days.

(21) Appl. No.: 13/569,106

(22) Filed: Aug. 7, 2012

(65) Prior Publication Data
US 2015/0205750 A1    Jul. 23, 2015

(51) Int. Cl.
| | |
|---|---|
| *G06F 15/16* | (2006.01) |
| *G06F 13/42* | (2006.01) |
| *G06F 1/26* | (2006.01) |
| *G09C 1/00* | (2006.01) |
| *H04L 9/32* | (2006.01) |
| *G06F 21/31* | (2013.01) |
| *H04L 29/06* | (2006.01) |
| *H02J 7/02* | (2016.01) |
| *H02J 5/00* | (2016.01) |

(52) U.S. Cl.
CPC .......... *G06F 13/4221* (2013.01); *G06F 1/266* (2013.01); *G09C 1/00* (2013.01); *H04L 9/3247* (2013.01); *G06F 21/31* (2013.01); *H02J 5/005* (2013.01); *H02J 7/025* (2013.01); *H02J 7/027* (2013.01); *H04L 9/32* (2013.01); *H04L 63/08* (2013.01)

(58) Field of Classification Search
CPC . H02J 5/005; H02J 7/025; H02J 7/027; H04B 5/002; H04L 63/08; H04L 9/32; G06F 21/31
See application file for complete search history.

(56) References Cited

U.S. PATENT DOCUMENTS

| | | | | |
|---|---|---|---|---|
| 5,541,489 | A * | 7/1996 | Dunstan | 320/134 |
| 6,804,727 | B1 * | 10/2004 | Rademacher | G06F 3/1204 |
| | | | | 710/305 |
| 7,360,004 | B2 * | 4/2008 | Dougherty et al. | 710/303 |
| 7,772,802 | B2 * | 8/2010 | Manico et al. | 320/108 |
| 8,160,727 | B2 * | 4/2012 | Coonan et al. | 700/22 |
| 8,901,881 | B2 * | 12/2014 | Partovi | 320/108 |
| 2004/0066174 | A1 * | 4/2004 | Choi | 320/149 |
| 2007/0103110 | A1 * | 5/2007 | Sagoo | 320/109 |
| 2007/0145830 | A1 * | 6/2007 | Lee et al. | 307/135 |

(Continued)

*Primary Examiner* — Andrew Georgandellis
*Assistant Examiner* — Anthony Fabbri
(74) *Attorney, Agent, or Firm* — McDermott Will & Emery LLP (57) ABSTRACT

Systems and methods for managing a wireless connection between a computing device and a peripheral module are provided. In some aspects, a computer-implemented method includes detecting a mechanical coupling between the peripheral module and the computing device. The method also includes identifying a first function of the mechanically coupled peripheral module, and comparing the first function to a preapproved function. The method also includes managing the wireless connection between the peripheral module and the computing device based on the comparison of the first function to the preapproved function.

19 Claims, 6 Drawing Sheets

(56) References Cited

U.S. PATENT DOCUMENTS

| | | | |
|---|---|---|---|
| 2007/0242651 A1* | 10/2007 | Hayem | G06F 13/4221 370/342 |
| 2008/0074080 A1* | 3/2008 | Luo | G06F 1/263 320/132 |
| 2008/0090520 A1* | 4/2008 | Camp et al. | 455/41.2 |
| 2008/0211458 A1* | 9/2008 | Lawther | H02J 7/025 320/132 |
| 2008/0270665 A1* | 10/2008 | Senatori | G06F 1/1616 710/303 |
| 2008/0272889 A1* | 11/2008 | Symons | 340/10.1 |
| 2009/0001929 A1* | 1/2009 | Posamentier | H02J 7/025 320/108 |
| 2009/0140692 A1* | 6/2009 | Hwang | 320/108 |
| 2009/0146608 A1* | 6/2009 | Lee | 320/108 |
| 2009/0156268 A1* | 6/2009 | Kim et al. | 455/573 |
| 2009/0169018 A1* | 7/2009 | Deisher | H04L 63/0869 380/278 |
| 2010/0146155 A1* | 6/2010 | Brock | G06F 9/4411 710/11 |
| 2010/0146308 A1* | 6/2010 | Gioscia et al. | 713/300 |
| 2010/0194334 A1* | 8/2010 | Kirby et al. | 320/108 |
| 2010/0291869 A1* | 11/2010 | Wilson | 455/41.1 |
| 2010/0291871 A1 | 11/2010 | Butler | |
| 2011/0095722 A1* | 4/2011 | Chang | 320/107 |
| 2011/0214158 A1* | 9/2011 | Pasquero et al. | 726/2 |
| 2011/0241824 A1* | 10/2011 | Uesugi | 340/5.8 |
| 2012/0021619 A1* | 1/2012 | Bilbrey | H01R 13/6205 439/39 |
| 2012/0043927 A1* | 2/2012 | Park et al. | 320/107 |
| 2012/0295634 A1* | 11/2012 | Kim | 455/456.1 |
| 2012/0300245 A1* | 11/2012 | Chatierjee et al. | 358/1.14 |
| 2013/0005252 A1* | 1/2013 | Lee et al. | 455/41.1 |
| 2013/0030892 A1* | 1/2013 | Liu et al. | 705/14.16 |
| 2013/0176115 A1* | 7/2013 | Puleston | H04L 67/04 340/10.51 |
| 2013/0187457 A1* | 7/2013 | Schlichter | H04L 12/10 307/31 |
| 2013/0304583 A1* | 11/2013 | Han et al. | 705/14.64 |
| 2014/0046707 A1* | 2/2014 | Hama | 705/5 |
| 2014/0080410 A1* | 3/2014 | Jung et al. | 455/41.1 |

* cited by examiner

SYSTEMS AND METHODS FOR MANAGING A WIRELESS CONNECTION BETWEEN A COMPUTING DEVICE AND A PERIPHERAL MODULE

BACKGROUND

The subject technology generally relates to computing systems and, in particular, relates to computing systems with peripheral modules.

A desktop or laptop computer may have ports that provide connections to different types of peripheral devices (e.g., chargers, universal serial bus (USB) drives, monitors, memory card readers, etc.). Because of limited space, the computer may be designed to have only a certain number of different types of physical ports to please an average user. The limited number of physical ports may make the computer inconvenient to a user who desires to connect many different types of peripheral devices to the computer. Furthermore, repeatedly connecting peripheral devices to and disconnecting the peripheral devices from the physical ports of the computer may damage or loosen the internal mechanical electrical connectors of the physical ports and/or the mechanical electrical connectors (internal or external) of the peripheral devices, thereby making connections between the peripheral devices and the computer difficult.

SUMMARY

According to various aspects of the subject technology, a computing system is provided. The system comprises a computing device. The computing device comprises a host body, a wireless data interface housed within the host body, and a wireless power interface housed within the host body. The host body comprises a mechanical coupling interface. The system also comprises a first peripheral module. The first peripheral module comprises a peripheral body, a wireless data interface housed within the peripheral body, and a wireless power interface housed within the peripheral body. The peripheral body comprises a mechanical coupling interface configured to couple to the mechanical coupling interface of the host body. The wireless data interface of the computing device and the wireless data interface of the first peripheral module are configured to wirelessly communicate data between one another when the mechanical coupling interface of the host body is coupled to the mechanical coupling interface of the peripheral body. The wireless power interface of the computing device and the wireless power interface of the first peripheral module are configured to wirelessly communicate power between one another when the mechanical coupling interface of the host body is coupled to the mechanical coupling interface of the peripheral body.

According to various aspects of the subject technology, a method for communicating data and power between a computing device and a peripheral module is provided. The method comprises mechanically coupling a host body of the computing device to a peripheral body of the peripheral module. The method also comprises wirelessly communicating data between a wireless data interface of the computing device and a wireless data interface of the peripheral module when the host body is mechanically coupled to the peripheral body. The method also comprises wirelessly communicating power between a wireless power interface of the computing device and a wireless power interface of the peripheral module when the host body is mechanically coupled to the peripheral body.

According to various aspects of the subject technology, a computing device is provided. The computing device comprises a host body having a mechanical coupling interface configured to couple to a mechanical coupling interface of a peripheral body of a peripheral module. The computing device also comprises a processing assembly housed within the host body. The computing device also comprises a wireless data interface housed within the host body and coupled to the processing assembly. The processing assembly is configured to communicate data with the peripheral module via a wireless data communication between the wireless data interface of the computing device and a wireless data interface of the peripheral module when the mechanical coupling interface of the host body is coupled to the mechanical coupling interface of the peripheral body. The computing device also comprises a power supply coupled to the processing assembly. The power supply is configured to deliver power to the processing assembly. The computing device also comprises a wireless power interface housed within the host body and coupled to the power supply. The power supply is configured to communicate power with the peripheral module via a wireless power communication between the wireless power interface of the computing device and a wireless power interface of the peripheral module when the mechanical coupling interface of the host body is coupled to the mechanical coupling interface of the peripheral body.

According to various aspects of the subject technology, a computer-implemented method for managing a wireless connection between a computing device and a peripheral module is provided. The method comprises detecting a mechanical coupling between the peripheral module and the computing device. The method also comprises identifying a first function of the mechanically coupled peripheral module, and comparing the first function to a preapproved function. The method also comprises managing the wireless connection between the peripheral module and the computing device based on the comparison of the first function to the preapproved function.

According to various aspects of the subject technology, a computing device for managing a wireless connection with a peripheral module is provided. The computing device comprises a host body having a mechanical coupling interface configured to couple to a mechanical coupling interface of a peripheral body of the peripheral module. The computing device also comprises a wireless power interface configured to detect the coupling between the peripheral module and the computing device. The computing device also comprises a processing assembly configured to identify a function of the coupled peripheral module, to compare the function of the peripheral module to a preapproved function, and to manage the wireless connection between the peripheral module and the computing device based on the comparison of the function of the peripheral module to the preapproved function.

According to various aspects of the subject technology, a machine-readable medium encoded with executable instructions for managing a wireless connection between a computing device and a peripheral module is provided. The instructions comprise code for detecting a mechanical coupling between the peripheral module and the computing device, and identifying a function of the mechanically coupled peripheral module. The instructions also comprise code for comparing the function of the peripheral module to a preapproved function, and authenticating the peripheral module. The instructions also comprise code for managing the wireless connection between the peripheral module and the computing device based on the comparison of the function of the peripheral module to the preapproved function and based on the authentication of the peripheral module.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, well-known structures and techniques have not been shown in detail so as not to obscure the subject technology.

Figure 1A:
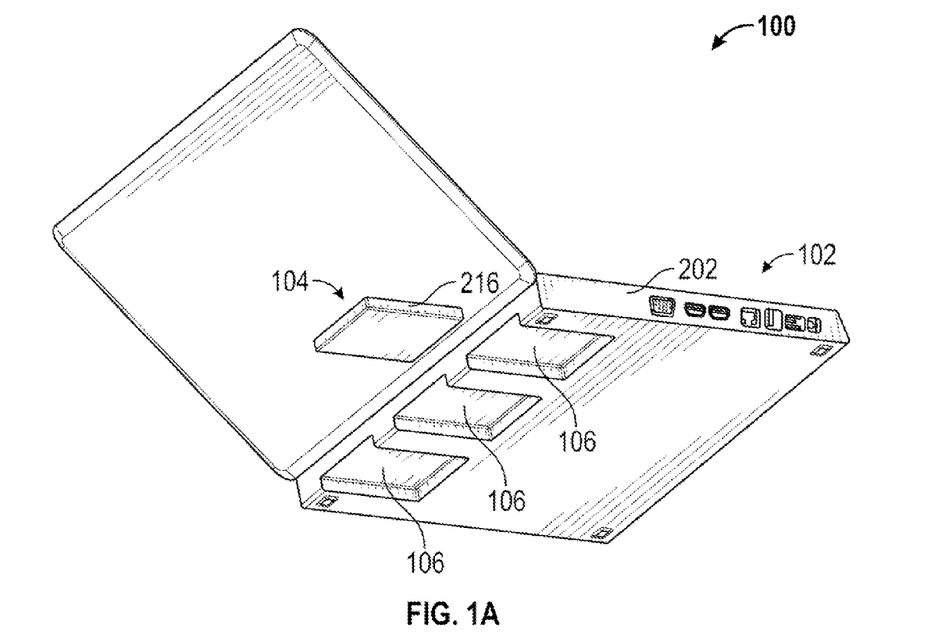
FIG. 1A illustrates a bottom perspective view of a computing system, in accordance with various aspects of the subject technology.
Figure 1B:
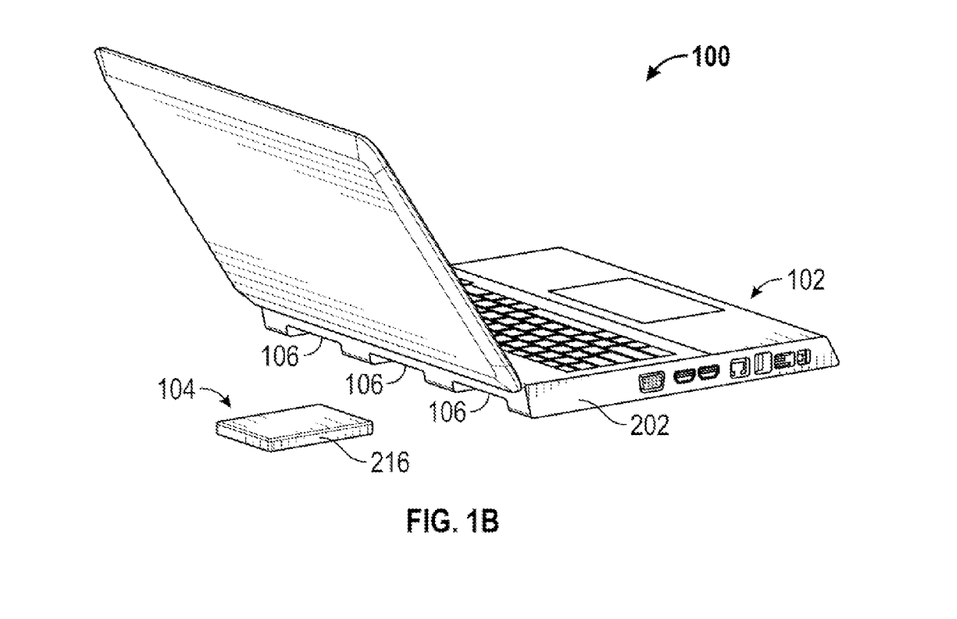
FIG. 1B illustrates a side view of a computing system, in accordance with various aspects of the subject technology.

FIGS. 1A and 1B illustrate an example of computing system 100, in accordance with various aspects of the subject technology. FIG. 1A illustrates a bottom perspective view of computing system 100, while FIG. 1B illustrates a side view of computing system 100. Computing system 100 facilitates the connection of computing device 102 to many different peripheral modules, such as peripheral module 104, and also overcomes problems associated with electrical connections between computing device 102 and the different peripheral modules. As shown, computing device 102 is a laptop computer. However, computing device 102 may be other types of electronic devices, such as a desktop computer, a netbook, a tablet, a mobile phone, etc. Peripheral module 104, for example, may comprise one or more peripheral devices (e.g., video adapters, audio adapters, network adapters, USB adapters, storage media, disc drives, printer adapters, scanner adapters, processors such as graphics processing units, memory card readers, etc.) and/or one or more physical ports (e.g., video ports, audio ports, networking ports, USB ports, etc.).

According to certain aspects, peripheral module 104 is configured to mechanically couple to computing device 102 without direct electrical contact (e.g., without a mechanical electrical connector penetrating a body of computing device 102 and/or a body of peripheral module 104) and to wirelessly communicate data and/or power with the computing device (e.g., transfer data and/or power from peripheral module 104 to computing device 102, and/or transfer data and/or power from computing device 102 to peripheral module 104). Computing device 102, for example, comprises host body 202 having one or more slots 106. Peripheral module 104 comprises peripheral body 216, which is formed such that peripheral body 216 may fit into any one of the one or more slots 106. Peripheral module 104 may mechanically couple to computing device 102 via magnetic coupling, adhesive coupling (e.g., glue, tape, Velcro, etc.), slide fit, friction fit, interlocking fit, and/or other methods without direct electrical contact between peripheral module 104 and computing device 102. In this way, the risk of damaging components of peripheral module 104 and/or computing device 102 as a result of their coupling to one another can be minimized compared to another peripheral module that couples to another computing device using mechanical electrical connectors (because the mechanical electrical connectors can break off or loosen as a result of their coupling to one another). Furthermore, because computing device 102 and peripheral module 104 wirelessly communicate data and/or power with one another, computing device 102 may be designed to seal components therein (e.g., computing device 102 may be designed without any physical ports thereon), thereby preventing contaminants and/or liquid from entering the inside of computing device 102.

Peripheral module 104 provides one or more functions. In some aspects, peripheral modules such as peripheral module 104 may be mechanically coupled to computing device 102, with each peripheral module providing one or more different functions. For example, one peripheral module can provide wireless power to computing device 102, and another peripheral module can serve as a USB hub for computing device 102. Because each of these peripheral modules wirelessly communicates with computing device 102 and mechanically couples to computing device 102, a user can readily switch between different peripheral modules having different functions. For example, each of the peripheral modules may have the same form factor, thereby allowing each peripheral module to mechanically couple to computing device 102 in the same manner (each peripheral module can fit into any one of the one or more slots 106). Should the user decide to switch from a first peripheral module having a first function to a second peripheral module having a second function, the user can conveniently replace the first peripheral module in a slot of computing device 102 with the second peripheral module. Thus, the user can swap out different peripheral modules depending on the specific needs of the user.

Figure 2:
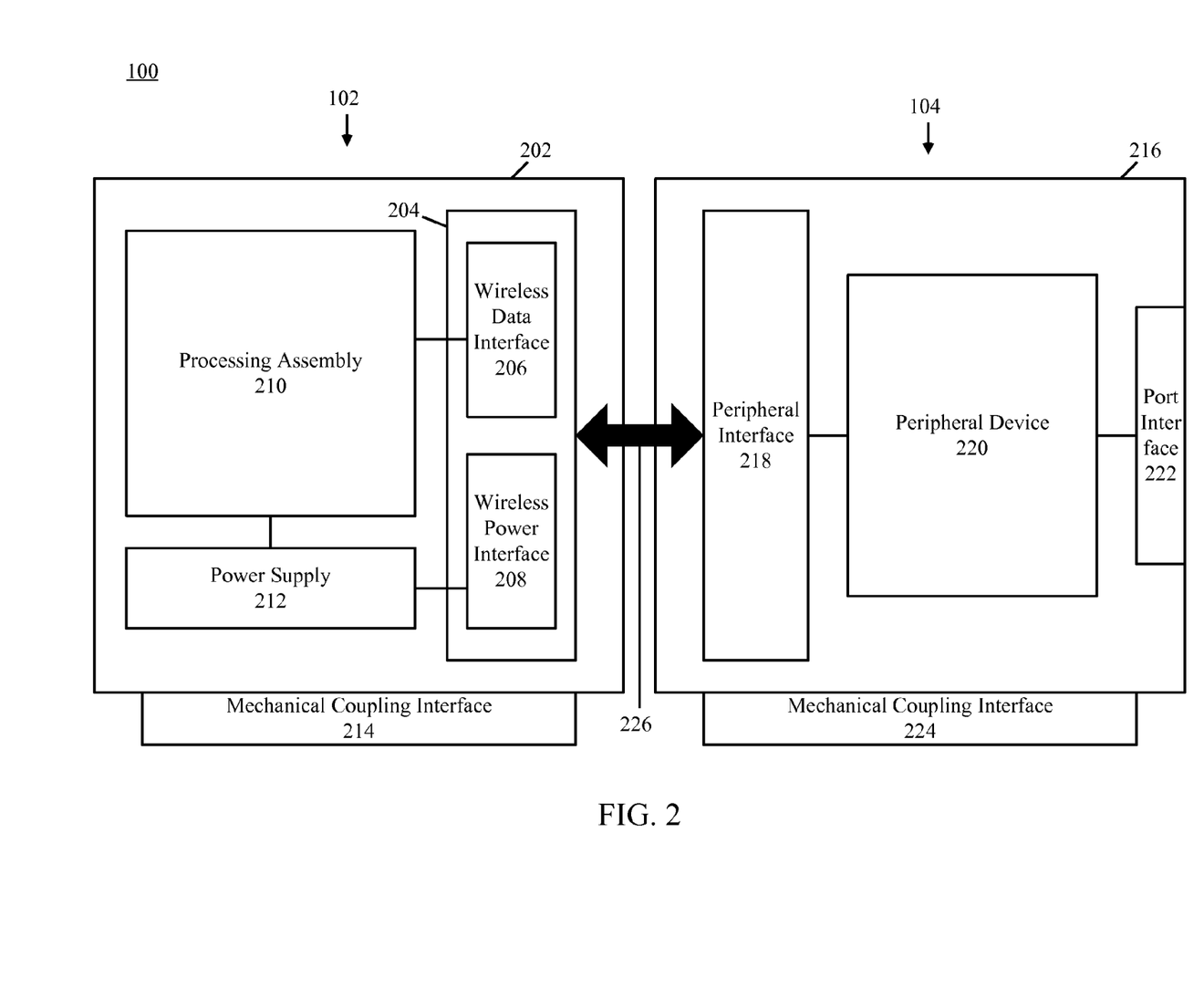
FIG. 2 is a block diagram illustrating components of a computing system, in accordance with various aspects of the subject technology.

FIG. 2 is a block diagram illustrating components of computing system 100, in accordance with various aspects of the subject technology. System 100 comprises computing device 102 having host body 202, peripheral interface 204, processing assembly 210, and power supply 212. Peripheral interface 204, processing assembly 210, and power supply 212 are housed within host body 202. Peripheral interface 204 comprises wireless data interface 206 (coupled to processing assembly 210) and wireless power interface 208 (coupled to power supply 212). Power supply 212 is coupled to processing assembly 210 and may distribute power to processing assembly 210. Host body 202 comprises mechanical coupling interface 214.

System 100 also comprises peripheral module 104 having peripheral body 216, peripheral interface 218, peripheral device 220, and port interface 222. Peripheral interface 218 and peripheral device 220 are housed within peripheral body 216. Peripheral body 218 comprises mechanical coupling interface 224, which is configured to couple to mechanical coupling interface 214 of host body 202. According to certain aspects, peripheral interface 218 of peripheral module 104 wirelessly communicates data and/or power with peripheral interface 204 of computing device 102, as represented by arrow 226. For example, peripheral interface 218 may comprise a wireless data interface configured to wirelessly communicate data with wireless data interface 206 of computing device 102. Peripheral interface 218 may also comprise a wireless power interface configured to wirelessly communicate power with wireless power interface 208 of computing device 102. Because computing device 102 and peripheral module 104 wirelessly communicate data and/or power with one another, host body 202 of computing device 102 may be designed to seal components therein, thereby preventing contaminants and/or liquid from entering the inside of computing device 102. In some aspects, host body 202 completely encapsulates processing assembly 210, power supply 212, and peripheral interface 204. In some aspects, processing assembly 210, power supply 212, and peripheral interface 204 are completely sealed within host body 202.

Figure 3:
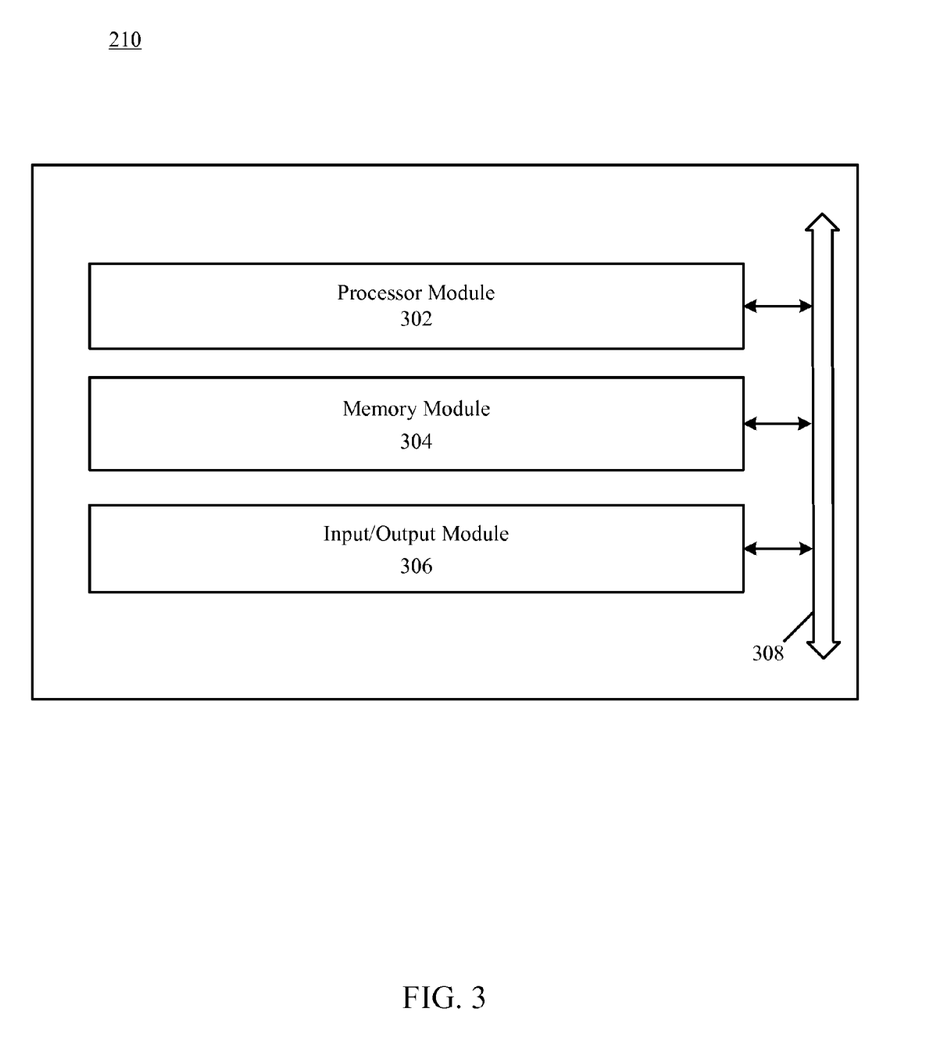
FIG. 3 is a block diagram illustrating components of a processing assembly, in accordance with various aspects of the subject technology.

FIG. 3 is a block diagram illustrating components of processing assembly 210, in accordance with various aspects of the subject technology. Processing assembly 210 may store and/or process information for computing device 102. Processing assembly 210 comprises processor module 302, memory module 304, input/output (I/O) module 306, and bus 308. In some aspects, memory module 304 may be used for volatile and/or non-volatile storage. Bus 308 may be any suitable communication mechanism for communicating information. Processor module 302, memory module 304, and I/O module 306 are coupled with bus 308 for communicating information between one another and/or communicating information between any of the modules of processing assembly 210 and a unit outside of processing assembly 210 (e.g., wireless data interface 206 in FIG. 2). The information communicated may include instructions and/or data. In some aspects, bus 308 may be a universal serial bus. In some aspects, bus 308 may provide Ethernet connectivity.

Processor module 302 may comprise one or more processors, where each processor may perform different functions or execute different instructions and/or processes. For example, one or more processors may execute instructions contained in memory module 304 for managing a wireless connection between computing device 102 and peripheral module 104 (e.g., implementing a connection policy between computing device 102 and peripheral module 104), and one or more processors may execute instructions for input/output functions.

Memory module 304 may include random access memory ("RAM") or other dynamic storage devices for storing information and instructions to be executed by processor module 302. Memory module 304 may also be used for storing temporary variables or other intermediate information during execution of instructions by processor 302. In some aspects, memory module 304 may comprise battery-powered static RAM, which stores information without requiring power to maintain the stored information. In some aspects, memory module 304 may include a magnetic disk or optical disk and may also store information and instructions. In some aspects, memory module 304 may comprise hard disk storage or electronic memory storage (e.g., flash memory). In some aspects, memory module 304 may be a machine-readable medium.

According to certain aspects, information may be provided to or received from processing assembly 210 via I/O module 306. For example, I/O module 306 is coupled to wireless data interface 206 of peripheral interface 204. Thus, I/O module 306 may communicate information with wireless data interface 206, which in turn may communicate information with a unit outside of computing device 102 (e.g., peripheral interface 218 of peripheral module 104 in FIG. 2). In some aspects, peripheral module 104 may couple computing device 102 to a user interface so that information can be communicated between computing device 102 and the user interface. The user interface, for example, may be a cathode ray tube ("CRT") or LCD monitor for displaying information to an operator of computing system 100. The user interface may also include, for example, a keyboard, a mouse, a printer, a scanner, a camera, a microphone, and/or other electronic devices. Thus, in some aspects, peripheral module 104 may be an adapter that may allow information to be communicated between computing device 102 and the user interface. For example, information may be communicated from the user interface to peripheral module 104, and then to wireless data interface 206 of computing device 102, and then to I/O module 306, and then to processor module 302. Conversely, information may be communicated from processor module 302 to I/O module 306, and then to wireless data interface 206, and then to peripheral module 104, and then to the user interface.

According to certain aspects, I/O module 306 may include one or more networking modules for transmitting information from processing assembly 210 and/or receiving information for processing assembly 210. For example, I/O module 306 may comprise an Ethernet adapter (e.g., a wireless local area network (WLAN) adapter) and/or a cellular modem. However, I/O module 306 may also comprise other networking modules for receiving information and/or transmitting information.

According to various aspects of the subject technology, methods described herein may be executed by processing assembly 210. Specifically, processor module 302 may execute one or more sequences of instructions contained in memory module 304. In one example, instructions may be read into memory module 304 from another machine-readable medium. For example, peripheral module 104 may comprise another machine-readable medium, and information may be transmitted from peripheral module 104 to wireless data interface 206, and then to I/O module 306, and then to memory module 304. In some aspects, instructions may be read directly into memory module 304 from an operator of computing system 100 via the user interface, peripheral module 104, wireless data interface 206, and/or I/O module 306.

Execution of the sequences of instructions contained in memory module 304 may cause processor module 302 to perform methods to manage a wireless connection between computing device 102 and peripheral module 104. For example, a computational algorithm for managing a wireless connection between computing device 102 and peripheral module 104 may be stored in memory module 304 as one or more sequences of instructions. Information related to the management of the wireless connection between computing device 102 and peripheral module 104 may be communicated from processor module 302 to memory module 304 via bus 308 for storage. In some aspects, the information may be communicated from processor module 302 and/or memory module 304 to I/O module 306 via bus 308. The information may then be communicated from I/O module 306 to an operator of computing system 100 via wireless data interface 206, peripheral module 104, and/or the user interface.

One or more processors in a multi-processing arrangement may also be employed to execute the sequences of instructions contained in memory module 304. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 302 for execution. Such a medium may take many forms, including, but not limited to, non-volatile media and volatile media. Non-volatile media include, for example, optical or magnetic disks. Volatile media include dynamic memory. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Returning to FIG. 2, peripheral module 104 provides one or more functions for computing device 102. For example, peripheral device 220 of peripheral module 104 may comprise a power supply (e.g., an AC adapter and/or a battery for supplying power to computing device 102), a video adapter (e.g., a video card comprising a graphics processing unit, and/or a device for enabling communication of one or more videos signals to and from computing device 102 via one or more video ports), an audio adapter (e.g., a sound card and/or a device for enabling communication of one or more audio signals to and from computing device 102 via one or more audio ports), a network adapter (e.g., an Ethernet card and/or a device for connecting computing device 102 to a network such as the Internet), a universal serial bus (USB) adapter (e.g., a USB hub), a storage medium (e.g., a hard drive), a disc drive (e.g., a CD drive, a DVD drive, a Blu-Ray disc drive, etc.), a printer adapter (e.g., a device for connecting computing device 102 to a printer via one or more printer ports), a scanner adapter (e.g., a device for connecting computing device 102 to a scanner via one or more scanner ports), a memory card reader (e.g., a compact flash reader, a secure digital (SD) card reader, a mini-SD card reader, a micro-SD card reader, etc.), and/or other electronic devices.

If peripheral device 220 is a type of device that uses one or more physical ports, then peripheral module 104 also includes the one or more physical ports that correspond to peripheral device 220. For example, as shown in FIG. 2, peripheral device 220 is a device that uses one or more physical ports. In particular, peripheral module 104 comprises port interface 222 coupled to peripheral device 220.

Port interface 222 comprises one or more physical ports configured to communicate data and/or power with peripheral device 220. For example, if peripheral device 220 is a video adapter, then port interface 222 may comprise one or more video ports (e.g., super video (S-video) ports, high-definition multimedia interface (HDMI) ports, video graphics array (VGA) ports, digital visual interface (DVI) ports, etc.). If peripheral device 220 is a USB adapter, then port interface 222 may comprise one or more USB ports. As another example, if peripheral device 220 is a power supply, then port interface 222 may comprise one or more ports for receiving power. Although peripheral module 204 is shown as comprising port interface 222, peripheral device 220 may, in some aspects, be a device that does not use one or more physical ports, and consequently, peripheral module 104 does not necessarily include port interface 222. For example, if peripheral device 220 is a storage medium that may be powered by power supply 212 of computing device 102 (e.g., via wireless power interface 208 and peripheral interface 218), then peripheral module 104 may not necessarily include port interface 222.

Figure 4A:
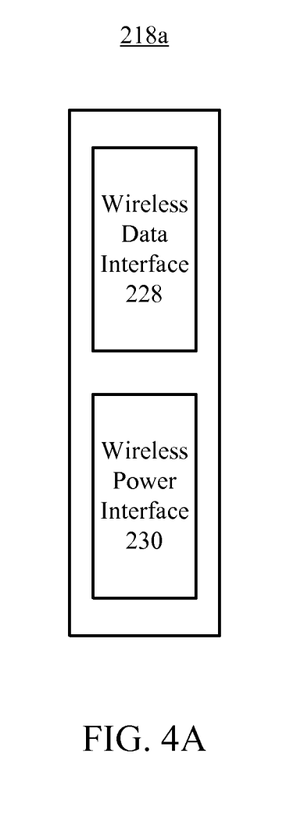
FIGS. 4A, 4B, and 4C are block diagrams illustrating components of a peripheral interface of a peripheral module, in accordance with various aspects of the subject technology.
Figure 4B:
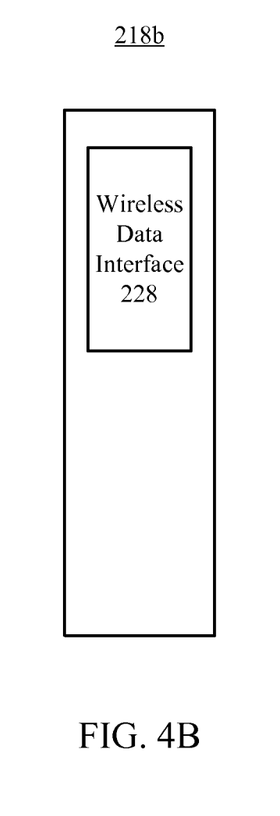
Figure 4C:
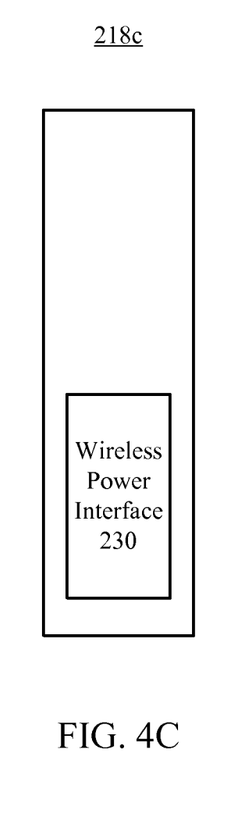

Furthermore, depending on the type of peripheral device 220 and what functions are provided, peripheral interface 218 of peripheral module 104 may include a wireless data interface (e.g., for wirelessly communicating data with computing device 102) and/or a wireless power interface (e.g., for wirelessly communicating power with computing device 102). For example, FIGS. 4A, 4B, and 4C are block diagrams illustrating components of peripheral interface 218 (shown as either 218a, 218b, or 218c) of peripheral module 104, in accordance with various aspects of the subject technology. FIG. 4A illustrates peripheral interface 218a comprising wireless data interface 228 (which may wirelessly communicate data with wireless data interface 206 of computing device 102) and wireless power interface 230 (which may wirelessly communicate power with wireless power interface 208 of computing device 102). FIG. 4B illustrates peripheral interface 218b comprising only wireless data interface 228, while FIG. 4C illustrates peripheral interface 218c comprising only wireless power interface 230.

If peripheral device 220 in FIG. 2 is a device that uses power from computing device 102 and/or provides power to computing device 102, then peripheral interface 218 of peripheral module 104 may comprise wireless power interface 230 (e.g., as shown in FIG. 4A or FIG. 4C). Power may be wirelessly delivered in the direction from computing device 102 to peripheral module 104, and/or in the direction from peripheral module 104 to computing device 102. For example, wireless power interface 208 of computing device 102 and wireless power interface 230 of peripheral module 104 are configured to wirelessly communicate power between one another (e.g., when mechanical coupling interface 214 of host body 202 is coupled to mechanical coupling interface 224 of peripheral body 216). In some aspects, wireless power interface 208 of computing device 102 and wireless power interface 230 of peripheral module 104 are configured to wirelessly communicate power between one another using electromagnetic induction (e.g., magnetic coupling, capacitive coupling, etc.), electrodynamic induction (e.g., inductive coupling, resonant inductive coupling, etc.), electrostatic induction (e.g., capacitive coupling), and/or electromagnetic radiation (e.g., beamed power, microwave power transmission, laser method, etc.). In some aspects, wireless power interface 208 of computing device 102 and/or wireless power interface 230 of peripheral module 104 may comprise an inductor, a transformer, a capacitor, an optical sensor, an antenna, and/or any other electrical component useful for facilitating the transfer of wireless power.

In one example in which power is wirelessly delivered from peripheral module 104 to computing device 102, peripheral device 220 comprises a power supply (e.g., an AC adapter and/or battery), and peripheral interface 218 comprises wireless power interface 230. Port interface 222 comprises at least one physical port configured to receive power for the power supply (e.g., from a power outlet). The power may be delivered from port interface 222 to the power supply, which in turn may deliver the power to wireless power interface 230, which in turn may wirelessly deliver the power to wireless power interface 208 (of computing device 102), which in turn may deliver the power to power supply 212 of computing device 102. Power supply 212, for example, may comprise a power distribution circuit that may deliver the power to processing assembly 210. In some aspects, power supply 212 may comprise a battery, and thus, the power delivered wirelessly from peripheral module 104 to power supply 212 may serve to charge this battery.

In another example in which power is wirelessly delivered from computing device 102 to peripheral module 104, peripheral device 220 of peripheral module 104 may be a device that runs on power from computing device 102 (e.g., a USB hub, a media card reader, a storage medium, etc.). In this regard, power supply 212 of computing device 102 may deliver power to wireless power interface 208, which in turn may deliver power to wireless power interface 230 (of peripheral module 104), which in turn may deliver power to peripheral device 220 so that peripheral device 220 may run on that power.

In addition to wireless power communication, data may be wirelessly communicated between computing device 102 and peripheral module 104. If peripheral device 220 of peripheral module 104 is a device that receives data from computing device 102 and/or transmits data to computing device 102, then peripheral interface 218 of peripheral module 104 may comprise wireless power interface 228 (e.g., as shown in FIG. 4A or FIG. 4B). Data may be wirelessly communicated in the direction from computing device 102 to peripheral module 104, and/or in the direction from peripheral module 104 to computing device 102. For example, wireless data interface 206 of computing device 102 and wireless data interface 228 of peripheral module 104 are configured to wirelessly communicate data between one another (e.g., when mechanical coupling interface 214 of host body 202 is coupled to mechanical coupling interface 224 of peripheral body 216). In some aspects, wireless data interface 206 of computing device 102 and wireless data interface 228 of peripheral module 104 are configured to wirelessly communicate data between one another using capacitive coupling, inductive coupling, and/or electromagnetic radiation (e.g., radio frequency (RF) high data rate short range communication (e.g., 60 GHz), short range optical communication, near field communication, etc.). In some aspects, wireless data interface 206 of computing device 102 and/or wireless data interface 228 of peripheral module 104 may comprise an inductor, a transformer, a capacitor, an optical sensor, an antenna, and/or any other electrical component useful for facilitating the transfer of wireless data.

In one example in which data is wirelessly communicated between peripheral module 104 and computing device 102, peripheral device 220 of peripheral module 104 comprises a video adapter having a graphics processing unit. Thus, peripheral module 104 may couple to computing device 102 and perform video processing for computing device 102, which may free processing assembly 210 of computing device 102 to perform other types of processing. Thus, instead of generating one or more video signals based on one or more drawing instructions, processing assembly 210 may transmit the one or more drawing instructions to wireless data interface 206, which in turn may wirelessly transmit the one or more drawing instructions to wireless data interface 228, which in turn may provide the one or more drawing instructions to the video adapter. Based on the received one or more drawing instructions, the video adapter may generate the one or more video signals and transmit the one or more video signals to wireless data interface 228, which in turn may wirelessly transmit the one or more video signals to wireless data interface 206, which in turn may provide the one or more video signals to processing assembly 210. To ensure that the one or more video signals are processed quickly (e.g., in the case of streaming video), wireless data interface 206 and wireless data interface 228 may wirelessly communicate data between one another very quickly. For example, wireless data interface 206 and wireless data interface 228 are configured to wirelessly communicate data between one another in a speed of at least 5 gigabits per second.

According to various aspects of the subject technology, power and/or data may be wirelessly communicated between computing device 102 and peripheral module 104 when mechanical coupling interface 214 of host body 202 is coupled to mechanical coupling interface 224 of peripheral body 216. In some aspects, mechanical coupling interface 214 is configured to couple to mechanical coupling interface 224 without direct electrical contact (e.g., without a mechanical electrical connector penetrating peripheral body 216 and/or host body 202). Thus, the risk of damaging components of peripheral module 104 and/or computing device 102 as a result of their coupling to one another can be minimized compared to another peripheral module that couples to another computing device using mechanical electrical connectors (because the mechanical electrical connectors can break off or loosen as a result of their coupling to one another).

For example, as shown in FIGS. 1A and 1B, mechanical coupling interface 214 of host body 202 comprises slot 106, and mechanical coupling interface of 224 of peripheral body 216 comprises the form of peripheral body 216 itself, which is adapted to fit within slot 106. Mechanical coupling interface 214 may couple to mechanical coupling interface 224 via magnetic coupling, adhesive coupling, slide fit, friction fit, interlocking fit, and/or other methods without direct electrical contact between peripheral module 104 and computing device 102. Although FIGS. 1A and 1B illustrate mechanical coupling interface 214 and mechanical coupling interface 224 coupling to one another as a body member fitting within a slot, mechanical coupling interface 214 and/or mechanical coupling interface 224 may be configured in other ways. For example, mechanical coupling interface 214 and/or mechanical coupling interface 224 may comprise a screw, a pin, a hook, a clip, a nail, a magnet, an adhesive, and/or another mechanical component useful for coupling mechanical coupling interface 214 and mechanical coupling interface 224 to one another.

According to various aspects of the subject technology, a connection policy may be implemented to manage how peripheral module 104 may wirelessly connect to computing device 102 for data and/or power communication between peripheral module 104 and computing device 102. For an administrator of a network of computers, for example, one disadvantage with having physical ports on each computer is that these physical ports can pose a security risk. That is, the physical ports may allow non-approved peripheral modules to physically connect to each computer. In contrast, peripheral module 104 communicates with computing device 102 wirelessly without the use of any physical ports. Thus, a software communications protocol may be implemented for security purposes to either allow peripheral module 104 to wirelessly connect to computing device 102 (for data and/or power communication) or prevent peripheral module 104 from wirelessly connecting to computing device 102 (for data and/or power communication). In some aspects, the protocol may identify a function of peripheral module 104 and compare this function to a list of preapproved functions. If the function of peripheral module 104 matches a preapproved function, then the protocol may allow peripheral module 104 to wirelessly connect to computing device 102 for data and/or power communication. Otherwise, peripheral module 104 is prevented from wirelessly connecting to computing device 102. The administrator, for example, may advantageously implement such a protocol on each computer of the network in order to manage what type of peripheral module may connect to a corresponding computer.

Figure 5A:
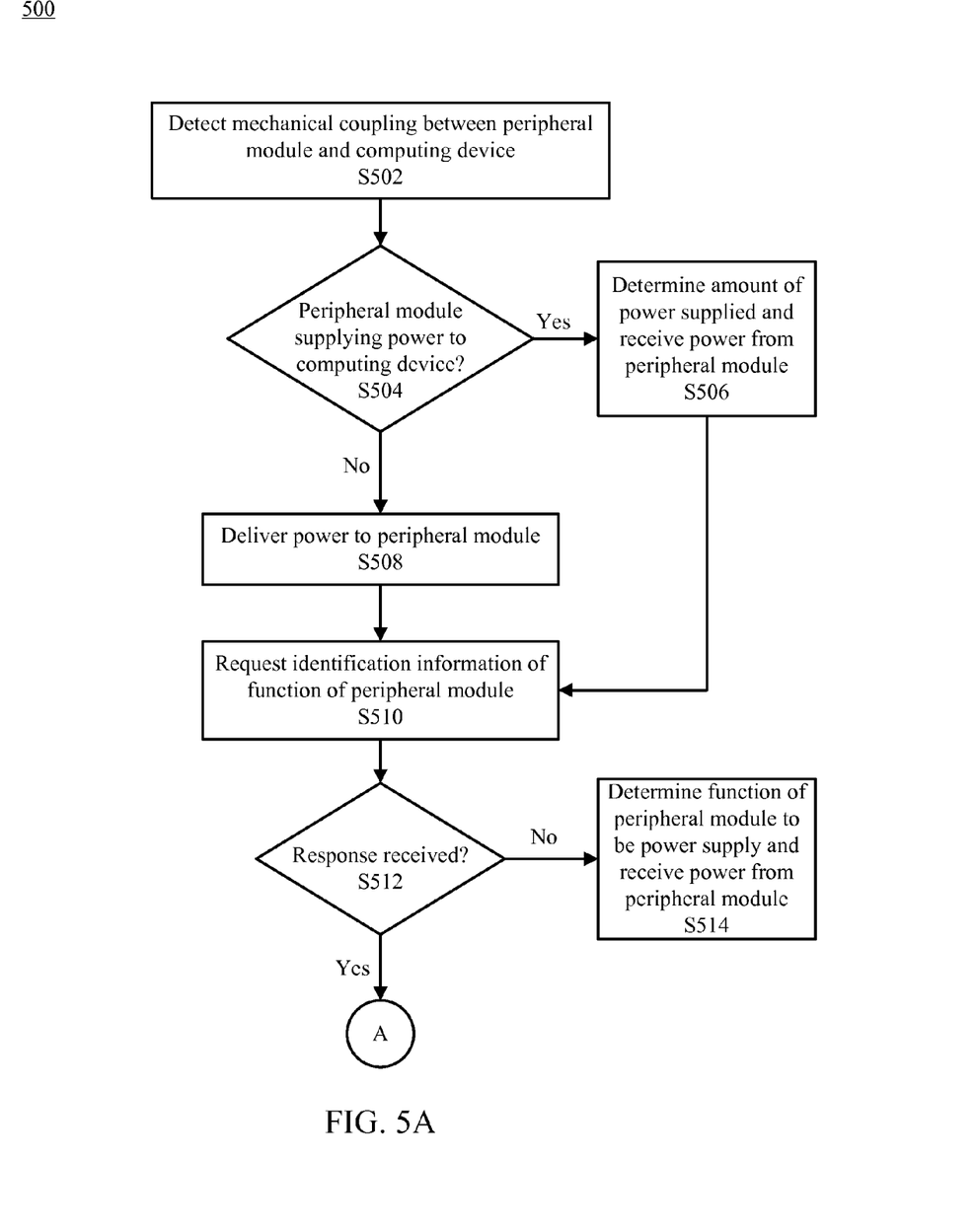
FIGS. 5A and 5B illustrate an example of a method for managing a wireless connection between a computing device and a peripheral module, in accordance with various aspects of the subject technology.
Figure 5B:
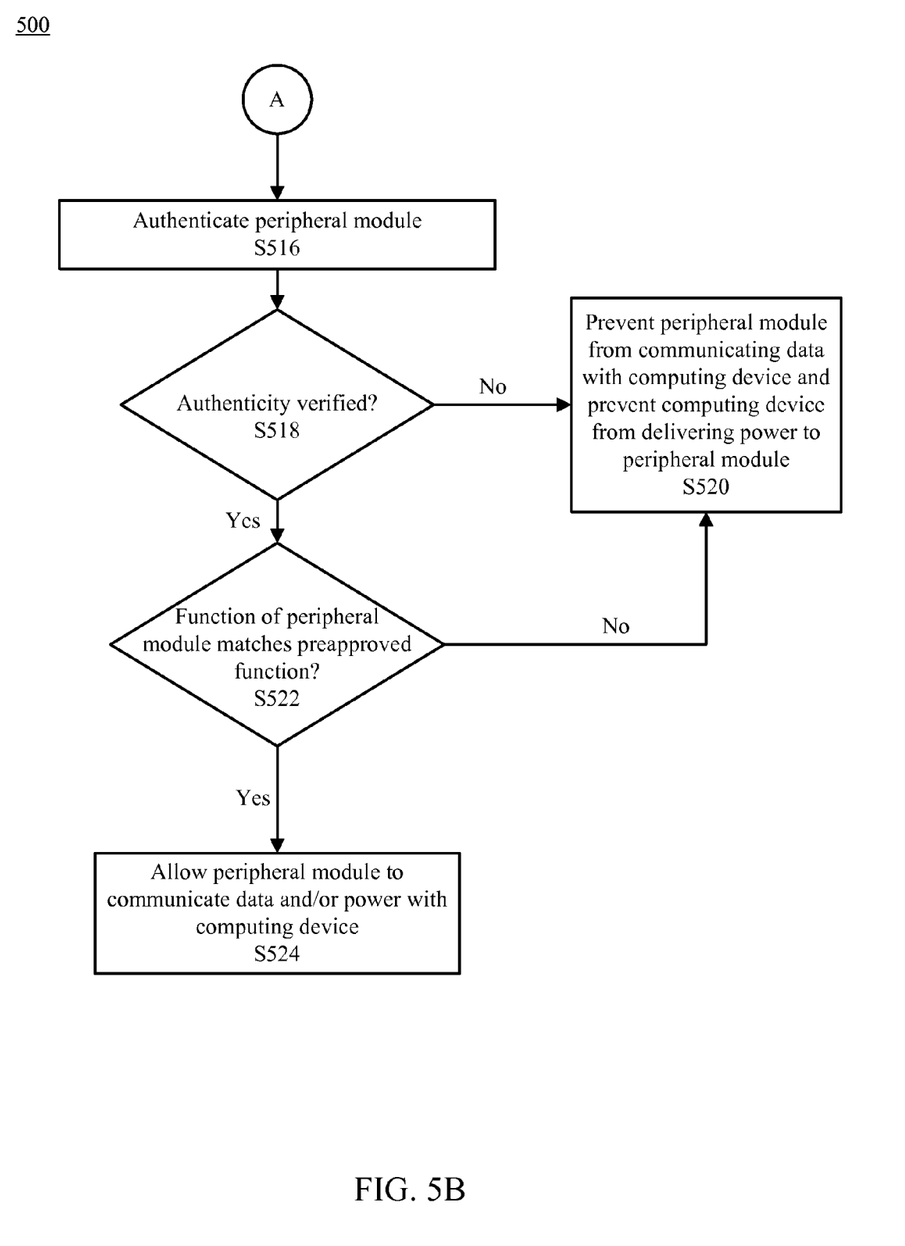

FIGS. 5A and 5B illustrate an example of method 500 for implementing the communications protocol, in accordance with various aspects of the subject technology. Method 500, for example, may be implemented to manage a wireless connection between computing device 102 and peripheral module 104. Method 500, for example, is implemented by processing assembly 210 of computing device 102. However, method 500 may be implemented by other systems having different configurations. According to method 500, computing device 102 detects a mechanical coupling between peripheral module 104 and computing device 102, identifies a function of mechanically coupled peripheral module 104, compares the function of peripheral module 104 to a list of preapproved functions, and manages the wireless connection between peripheral module 104 and computing device 102 based on the comparison of the function of peripheral module 104 to the preapproved function (e.g., either allowing peripheral module 104 to communicate data and/or power with computing device 102 or preventing peripheral module 104 from communicating data and/or power with computing device 102).

The list of preapproved functions may be set by the user of computing device 102, or—if computing device 102 is part of a network of computers—by the administrator of the network. Depending on the preference of the user or the administrator, a preapproved function of peripheral module 104 may include a power supply function, a video adapter function, an audio adapter function, a network adapter function, a printer adapter function, a scanner adapter function, and/or any other function that the user or the administrator considers allowable for connecting to computing device 102 for data and/or power communication between peripheral module 104 and computing device 102. In some aspects, the preapproved function may exclude functions that may potentially allow a hacker to import undesirable content into computing device 102 via the connection from peripheral module 104. For example, the preapproved function may exclude a universal serial bus (USB) adapter function, a storage medium function, a disc drive function, a memory card reader function and/or any other function that the user or the administrator considers unacceptable for connecting to connect to computing device 102.

According to step S502 of method 500, peripheral interface 204 of computing device 102 detects a mechanical coupling between computing device 102 and peripheral module 104. For example, wireless power interface 208 of peripheral interface 204 may detect the mechanical coupling by detecting an inductive load, inductive power, a capacitive load, and/or capacitive power from peripheral module 104 (e.g., from wireless power interface 230). However, computing device 102 may detect the mechanical coupling using other techniques. For example, the mechanical coupling may activate a button or switch on computing device 102 that would generate a signal (for processing assembly 210) indicating that computing device 102 is mechanically coupled to peripheral module 104. Returning to the example in which wireless power interface 208 detects the mechanical coupling by detecting the inductive load, inductive power, capacitive load, and/or capacitive power from peripheral module 104, if such an inductive load, inductive power, capacitive load, and/or capacitive power is not detected, then peripheral interface 204 may determine that peripheral module 204 is not mechanically coupled to computing device 102, and method 500 may terminate. However, if the inductive load, inductive power, capacitive load, and/or capacitive power is detected, then according to step S504, peripheral interface 204 determines if peripheral module 104 is supplying power (e.g., wirelessly) to computing device 102. If peripheral module 104 is supplying power, then it is likely that peripheral module 104 is a charger, a docking station, or another similar device. In this case, according to step S506, peripheral interface 204 determines the amount of power being supplied and receives the power from peripheral module 104. For example, peripheral device 220 may comprise a power supply that may deliver power to wireless power interface 230, which in turn may wirelessly deliver power to wireless power interface 208, which may deliver the power to power supply 212 so that power supply 212 may be charged (if power supply 212 comprises a battery) and/or so that power supply 212 may distribute the power to processing assembly 210.

If peripheral module 104 is not supplying power, then it is likely that peripheral module 104 is a device that needs power to run. In this case, according to step S508, peripheral interface 204 delivers power to peripheral module 104. For example, power supply 212 may deliver power to wireless power interface 208, which in turn may wirelessly deliver power to wireless power interface 230, which in turn may deliver the power to peripheral device 220 to run this device. Note that if peripheral module 104 is a peripheral that supplies its own power but does not communicate power with computing device 102, step S508 may be skipped or its implementation may still be attempted (with peripheral module 104 possibly preventing computing device 102 from delivering power to peripheral module 104).

After either step S508 or S506 is initiated, computing device 102 identifies a function of peripheral module 104. According to step S510, computing device 102 transmits a request (e.g., via wireless data interface 206) to peripheral module 104 for identification information of the function of peripheral module 104. Peripheral interface 204 receives a response to the request from peripheral module 104. The response, for example, may comprise the identification information of the function of peripheral module 104. According to steps S512 and S514, if no response is received, then computing device 102 determines the function of peripheral module 104 to be a power supply. In this situation, peripheral interface 204 continues receiving power from peripheral module 104.

If the response is received (e.g., wirelessly from peripheral module 104), then a first security measure is implemented to verify that peripheral module 104 has permission to connect to computing device 102 for data and/or power communication with computing device 102. For example, the first security measure may require a verified boot from peripheral module 104 (e.g., allowing peripheral module 104 to connect to computing device 102 for data and/or power communication with computing device 102 only if computing device 102 receives and verifies a signed certificate of authenticity from peripheral module 104). Thus, according to steps S512 and S516, if the response is received, then computing device 102 (e.g., via processing assembly 210 and/or peripheral interface 204) authenticates peripheral module 104. Computing device 102 may authenticate peripheral module 104, for example, by receiving a cryptographic validation of authenticity from peripheral module 104 and verifying the received cryptographic validation of authenticity (e.g., making sure that the received cryptographic validation of authenticity is signed from a trustworthy source).

According to steps S518 and S520, if the cryptographic validation of authenticity is not verified, then computing device 102 (e.g., via processing assembly 210 and/or peripheral interface 204) prevents peripheral module 104 from communicating data with computing device 102 and prevents computing device 102 from delivering power to peripheral module 104. Computing device 102 may prevent delivery of power to peripheral module 104 until peripheral module 104 is no longer mechanically coupled to computing device 102. If the function of peripheral module 104 is a power supply function (e.g., peripheral device 220 comprises a power supply), then computing device 102 may allow peripheral module 104 to continue to supply power to computing device 102.

If the cryptographic validation of authenticity is verified, then a second security measure is implemented to verify that peripheral module 104 has permission to connect to computing device 102. For example, the second security measure may require that the function of peripheral module 104 be a preapproved one. According to steps S518 and S522, if the cryptographic validation of authenticity is verified, then computing device 102 (e.g., via processing assembly 210 and/or peripheral interface 204) may compare the function of peripheral module 104 to one of the functions of the list of preapproved functions.

According to steps S522 and S520, if the function of peripheral module 104 does not match any of the functions of the list of preapproved functions, then computing device 102 (e.g., via processing assembly 210 and/or peripheral interface 204) prevents peripheral module 104 from communicating data with computing device 102 and prevents computing device 102 from delivering power to peripheral module 104. However, according to steps S522 and S524, if the function of peripheral module 104 matches one of the functions of the list of preapproved functions, then computing device 102 allows peripheral module 104 to communicate data and/or power with computing device 102. If allowed, a standard enumeration process for peripheral devices (e.g., a USB enumeration process, a hotplug process, a peripheral component interconnect (PCI) device detection process, etc.) may be implemented, and appropriate drivers may be loaded as needed by computing device 102. The user of computing device 102 may also be notified of the allowed connection.

Although method 500 is described above as implementing the first security measure (e.g., verified boot) and the second security measure (e.g., comparing the function of peripheral module 104 to a preapproved function), method 500 may also be implemented without the first security measure. In such a case, step S512 may proceed directly to step S522 while skipping steps S516 and S518.

Furthermore, peripheral module 104 is described above with respect to method 500 as having a single function (e.g., a single peripheral device 220). However, in some aspects, peripheral module 104 may have a plurality of functions (e.g., a plurality of peripheral devices). In such a case, method 500 may be repeated (e.g., in a loop) for each function of peripheral module 104 such that a connection for data and/or power communication specific to each function may either be allowed or prevented.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A computer-implemented method comprising:
    detecting a mechanical coupling between a peripheral module and a slot in a host body of a computing device when the peripheral module is inserted into the slot and secured by interlocking or friction fit, both the slot and the host body being free of electrical connectors penetrating the peripheral module, and the peripheral module being free of electrical connectors penetrating either the slot or the host body, and the mechanical coupling including physical contact between the peripheral module and the slot without direct electrical contact;
    determining, in response to detecting the mechanical coupling, whether the mechanically coupled peripheral module within the slot is supplying power to the computing device;
    receiving power from the mechanically coupled peripheral module if it is determined that the mechanically coupled peripheral module is supplying power to the computing device;
    identifying, if it is determined that the mechanically coupled peripheral module within the slot is not supplying power to the computing device, a first function of the mechanically coupled peripheral module;
    authenticating the peripheral module in response to the identification of the first function; comparing the first function to a preapproved function in response to the authentication of the peripheral module;
    and managing a wireless connection between the peripheral module and the computing device based on the comparison of the first function to the preapproved function.

2. The method of claim 1, wherein detecting the mechanical coupling comprises detecting at least one of an inductive load, inductive power, a capacitive load, or capacitive power from the peripheral module.

3. The method of claim 1, further comprising:
    detecting an additional mechanical coupling of an additional peripheral module within an additional slot in the host body of the computing device, the additional slot being free of electrical connectors penetrating the host body and the additional mechanical coupling including a physical connection between the additional peripheral module and the computing device without direct electrical contact;
    determining, in response to detecting the additional mechanical coupling, that the mechanically coupled additional peripheral module within the additional slot is supplying power to the computing device;
    determining an amount of power supplied by the additional peripheral module that is supplying power to the computing device; and
    receiving, by the computing device, the power from the additional peripheral module.

4. The method of claim 3, further comprising distributing the received power from the additional peripheral module to at least one of a battery of the computing device or a processing assembly of the computing device.

5. The method of claim 1, further comprising delivering, by the computing device, power to the peripheral module if the peripheral module is not supplying power to the computing device.

6. The method of claim 1, wherein identifying the first function comprises:
    transmitting a request to the peripheral module for identification information of the first function of the peripheral module; and
    receiving a response to the request, the response comprising the identification information of the first function.

7. The method of claim 1, wherein authenticating the peripheral module comprises:
    receiving a cryptographic validation of authenticity from the peripheral module; and
    verifying the received cryptographic validation of authenticity.

8. The method of claim 1, wherein managing the wireless connection comprises:
    allowing the peripheral module to communicate data with the computing device if the first function matches the preapproved function; and
    allowing the peripheral module to communicate power with the computing device if the first function matches the preapproved function.

9. The method of claim 1, wherein managing the wireless connection comprises:
    preventing the peripheral module from communicating data with the computing device if the first function does not match the preapproved function; and
    preventing the computing device from delivering power to the peripheral module if the first function does not match the preapproved function.

10. The method of claim 1, further comprising:
    identifying a second function of the peripheral module;
    comparing the second function to the preapproved function; and
    managing the wireless connection between the peripheral module and the computing device based on the comparison of the second function to the preapproved function.

11. The method of claim 10, wherein managing the wireless connection between the peripheral module and the computing device based on the comparison of the second function to the preapproved function comprises:
    allowing the peripheral module to communicate data with the computing device if the second function matches the preapproved function; and
    allowing the peripheral module to communicate power with the computing device if the second function matches the preapproved function.

12. The method of claim 10, wherein managing the wireless connection between the peripheral module and the computing device based on the comparison of the second function to the preapproved function comprises:
- preventing the peripheral module from communicating data with the computing device if the second function does not match the preapproved function; and
- preventing the computing device from delivering power to the peripheral module if the second function does not match the preapproved function.

13. The method of claim 1, wherein the preapproved function consists of at least one of a power supply function, a video adapter function, an audio adapter function, a network adapter function, a printer adapter function, or a scanner adapter function.

14. A computing device comprising:
- a host body having a mechanical coupling interface slot that is configured to couple to a mechanical coupling interface of a peripheral body of a peripheral module, the peripheral module being free of electrical connectors penetrating either the slot or the host body, and both the slot and the host body being free of electrical connectors penetrating the peripheral module;
- a wireless power interface configured to detect a mechanical coupling between the peripheral module and a slot in the host body of the computing device when the peripheral module is inserted into the slot and secured by interlocking or friction fit, the mechanical coupling including physical contact between the peripheral module and the slot without direct electrical contact; and
- a processing assembly configured to:
  - determine, in response to detecting the coupling, whether the coupled peripheral module is supplying power to the computing device:
  - receive power from the coupled peripheral module if it is determined that the coupled peripheral module is supplying power to the computing device:
  - identify, if it is determined that the coupled peripheral module is not supplying power to the computing device, a function of the coupled peripheral module;
  - authenticate the peripheral module in response to the identification of the first function;
  - compare the function of the peripheral module to a preapproved function in response to the authentication of the peripheral module; and
  - manage a wireless connection between the peripheral module and the computing device based on the comparison of the function of the peripheral module to the preapproved function.

15. The computing device of claim 14, wherein the wireless power interface is configured to detect the coupling between the peripheral module and the computing device by detecting at least one of an inductive load, inductive power, a capacitive load, or capacitive power from the peripheral module.

16. The computing device of claim 14, wherein the processing assembly is configured to:
- allow the peripheral module to communicate data with the computing device if the function of the peripheral module matches the preapproved function;
- allow the peripheral module to communicate power with the computing device if the function of the peripheral module matches the preapproved function;
- prevent the peripheral module from communicating data with the computing device if the function of the peripheral module does not match the preapproved function; and
- prevent the computing device from delivering power to the peripheral module if the function of the peripheral module does not match the preapproved function.

17. A non-transitory machine-readable medium encoded with executable instructions, the instructions comprising code for:
- detecting a mechanical coupling between a peripheral module and a slot in a host body of a computing device, when the peripheral module is inserted into the slot and secured by interlocking or friction fit, the mechanical coupling including physical contact between the peripheral module and the slot without direct electrical contact, both the slot and the host body being free of electrical connectors penetrating the peripheral device, and the peripheral device being free of electrical connectors penetrating either the slot or the host body,
- determining, in response to detecting the mechanical coupling, whether the mechanically coupled peripheral module within the slot is supplying power to the computing device:
- receiving power from the mechanically coupled peripheral module if it is determined that the mechanically coupled peripheral module is supplying power to the computing device:
- identifying, if it is determined that the mechanically coupled peripheral module is not supplying power to the computing device, a function of the mechanically coupled peripheral module;
- authenticating the peripheral module in response to the identification of the function; comparing the function of the peripheral module to a preapproved function in response to the authentication of the peripheral module; and
- managing a wireless connection between the peripheral module and the computing device based on the comparison of the function of the peripheral module to the preapproved function.

18. The non-transitory machine-readable medium of claim 17, wherein managing the wireless connection comprises:
- allowing the peripheral module to communicate data with the computing device if the function of the peripheral module matches the preapproved function;
- allowing the peripheral module to communicate power with the computing device if the function of the peripheral module matches the preapproved function;
- preventing the peripheral module from communicating data with the computing device if the function of the peripheral module does not match the preapproved function; and
- preventing the computing device from delivering power to the peripheral module if the function of the peripheral module does not match the preapproved function.

19. The non-transitory machine-readable medium of claim 17, wherein the preapproved function excludes at least one of a universal serial bus (USB) adapter function, a storage medium function, a disc drive function, or a memory card reader function.

* * * * *